(12) United States Patent
Sieh et al.

(10) Patent No.: US 12,463,834 B2
(45) Date of Patent: *Nov. 4, 2025

(54) EMBEDDING PROTECTED MEMORY ACCESS INTO A RFID AUTHENTICATION PROCESS BASED ON A CHALLENGE-RESPONSE MECHANISM

(71) Applicant: Centro de Pesquisas Avançadas Wernher von Braun, Campinas (BR)

(72) Inventors: Alexander Peter Sieh, Campinas (BR); Henrique Uemura Okada, Marilia (BR)

(73) Assignee: CENTRO DE PESQUISAS AVANCADES VON BRAUN, Campinas (BR)

( * ) Notice: Subject to any disclaimer, the term of this patent is extended or adjusted under 35 U.S.C. 154(b) by 520 days.

This patent is subject to a terminal disclaimer.

(21) Appl. No.: 17/382,532

(22) Filed: Jul. 22, 2021

(65) Prior Publication Data
US 2021/0351942 A1    Nov. 11, 2021

Related U.S. Application Data

(63) Continuation of application No. 15/561,714, filed as application No. PCT/IB2016/051660 on Mar. 23, 2016, now Pat. No. 11,075,768.
(Continued)

(51) Int. Cl.
*H04L 9/32*        (2006.01)
*G06F 21/60*       (2013.01)
(Continued)

(52) U.S. Cl.
CPC .......... *H04L 9/3271* (2013.01); *G06F 21/602* (2013.01); *G06F 21/72* (2013.01);
(Continued)

(58) Field of Classification Search
None
See application file for complete search history.

(56) References Cited

U.S. PATENT DOCUMENTS 6,842,106 B2    1/2005  Hughes et al.
7,742,348 B2 *  6/2010  Schuessler ........... H01Q 1/2225
                                                       365/191
(Continued)

FOREIGN PATENT DOCUMENTS

CN    101957923 A    1/2011
CN    103218633 A    7/2013
(Continued)

OTHER PUBLICATIONS

"EPC Radio-Frequency Identity Protocols Generation-2 UHF RFID", pp. 1-152, Version 2.0.0.*
(Continued)

*Primary Examiner* — Syed A Zaidi
*Assistant Examiner* — Vadim Savenkov
(74) *Attorney, Agent, or Firm* — Fleit Intellectual Property Law; Jon Gibbons

(57) ABSTRACT

A RFID tag, a reader and a protocol allow a protected read operation in a two-step tag authentication with cipher-block cryptography. A challenge-response mechanism using a shared secret symmetric key for tag authentication includes a challenge and information to read data from a tag's memory. Tag's enhanced reply to the challenge-response mechanism includes a response to the reader's challenge and data from the tag's memory. A method embeds a protected write operation in a four-step reader authentication with cipher-block cryptography. The protocol allows a challenge-response mechanism using the shared secret symmetric key for reader authentication including a challenge and information to write data to the tag's memory. Reader's enhanced reply to the challenge-response mechanism includes a
(Continued)

response to the tag's challenge and data for writing to the tag's memory. Authenticated read and write data may be in plaintext, message authentication code (MAC)-protected, encrypted, or both encrypted and MAC protected.

11 Claims, 10 Drawing Sheets

Related U.S. Application Data

(60) Provisional application No. 62/139,264, filed on Mar. 27, 2015.

(51) Int. Cl.
| | |
|---|---|
| *G06F 21/72* | (2013.01) |
| *G06K 7/10* | (2006.01) |
| *G06K 19/14* | (2006.01) |
| *H04L 9/40* | (2022.01) |
| *H04W 4/80* | (2018.01) |
| *H04W 12/033* | (2021.01) |
| *H04W 12/0431* | (2021.01) |
| *H04W 12/06* | (2021.01) |

(52) U.S. Cl.
CPC ......... *G06K 7/10297* (2013.01); *G06K 19/14* (2013.01); *H04L 63/0869* (2013.01); *H04W 12/033* (2021.01); *H04W 12/0431* (2021.01); *H04W 12/06* (2013.01); *H04L 2209/12* (2013.01); *H04L 2209/72* (2013.01); *H04L 2209/805* (2013.01); *H04W 4/80* (2018.02)

(56) References Cited

U.S. PATENT DOCUMENTS

| | | | | |
|---|---|---|---|---|
| 9,367,711 | B1* | 6/2016 | Dacus | G06K 7/0008 |
| 9,940,490 | B1 | 4/2018 | Robshaw | |
| 2007/0194889 | A1 | 8/2007 | Bailey et al. | |
| 2008/0068175 | A1 | 3/2008 | Hockey et al. | |
| 2008/0129447 | A1* | 6/2008 | Choi | H04L 63/04 |
| | | | | 340/5.61 |
| 2009/0033464 | A1 | 2/2009 | Friedrich | |
| 2010/0073140 | A1* | 3/2010 | Tseng | G06F 21/31 |
| | | | | 340/10.3 |
| 2010/0265041 | A1 | 10/2010 | Almog et al. | |
| 2011/0068905 | A1 | 3/2011 | Stern | |
| 2011/0215906 | A1 | 9/2011 | Lee | |
| 2011/0215908 | A1* | 9/2011 | Lee et al. | |
| 2011/0291803 | A1* | 12/2011 | Bajic | G08B 13/2462 |
| | | | | 340/10.1 |
| 2011/0305335 | A1* | 12/2011 | Negishi | H04L 9/0838 |
| | | | | 380/255 |
| 2015/0102909 | A1* | 4/2015 | Hinz | H04L 9/3234 |
| | | | | 340/10.1 |
| 2018/0091317 | A1 | 3/2018 | Sieh et al. | |

FOREIGN PATENT DOCUMENTS

| | | | | |
|---|---|---|---|---|
| WO | WO-0241650 A1 * | 5/2002 | ......... | G06K 7/10059 |
| WO | WO-2007149218 A2 * | 12/2007 | ......... | G06K 19/0723 |
| WO | WO2011137499 A1 | 11/2011 | | |

OTHER PUBLICATIONS

Bailey, D.V., Juels, A. (2006). Shoehorning Security into the EPC Tag Standard. In: De Prisco, R., Yung, M. (eds) Security and Cryptography for Networks. SCN 2006. Lecture Notes in Computer Science, vol. 4116. Springer, Berlin, Heidelberg. https://doi.org/10.1007/11832072_21.*

Feldhofer, Martin, Sandra Dominikus, and Johannes Wolkerstorfer. "Strong authentication for RFID systems using the AES algorithm." Cryptographic Hardware and Embedded Systems-CHES 2004: 6th International Workshop Cambridge, MA, USA, Aug. 11-13, 2004. Proceedings 6. Springer Berlin Heidelberg, 2004.*

English Translation of Office Action issued for Chinese patent application No. 201680029086.8 dated Jun. 3, 2020.

Office Action issued for Chinese patent application No. 201680029086.8 dated Jun. 3, 2020.

Search Report issued for Chinese patent application No. 201680029086.8 dated May 27, 2020.

Search Report issued for Chinese patent application No. 201680029086.8_English Translation dated May 27, 2020 2020.

Written Opinion of the International Preliminary Examining Authority dated Sep. 20, 2016, received for International Application No. PCT/IB2015/001569.

Non-Final Rejection for U.S. Appl. No. 15/561,714, issued on Jul. 30, 2019.

\* cited by examiner

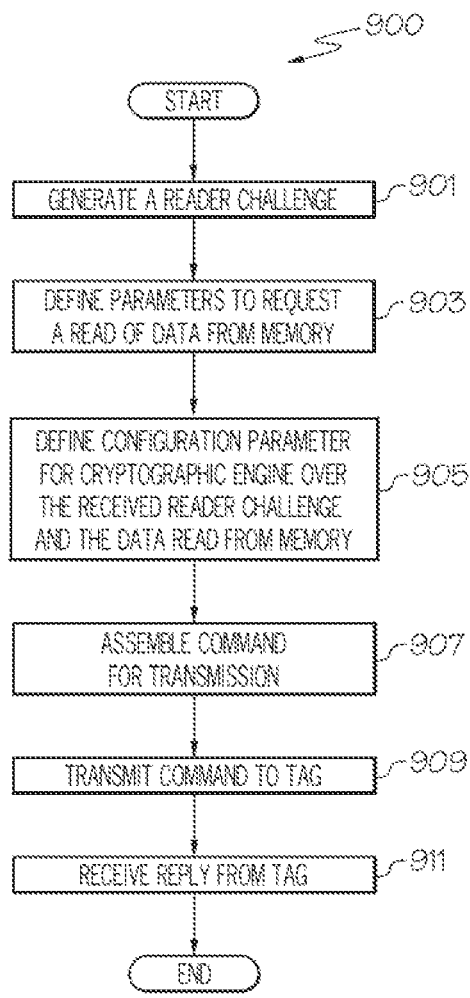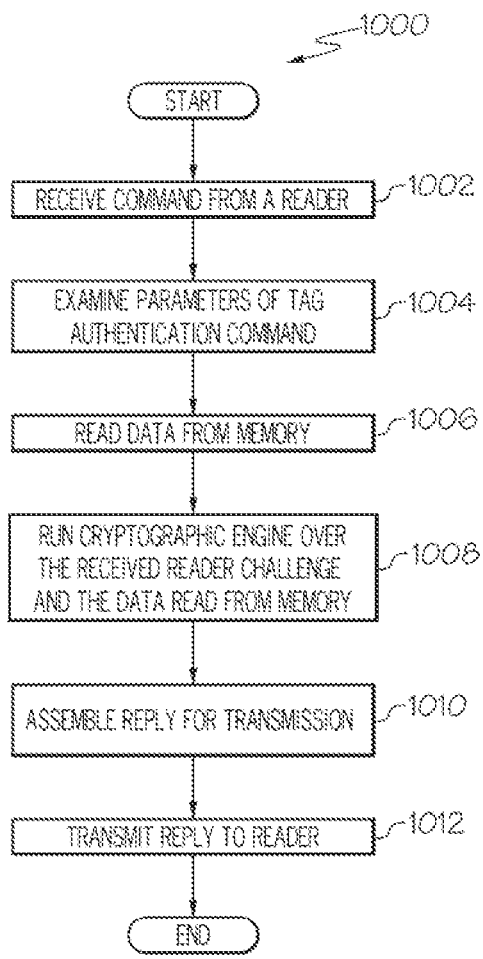
FIG. 9
FIG. 10

EMBEDDING PROTECTED MEMORY ACCESS INTO A RFID AUTHENTICATION PROCESS BASED ON A CHALLENGE-RESPONSE MECHANISM

CROSS REFERENCE TO RELATED APPLICATION

The present application claims priority to U.S. Provisional Application No. 62/139,264 filed on Mar. 27, 2015, which is hereby fully incorporated by reference herein. The present application is a continuation of U.S. patent application Ser. No. 15/561,714, which is hereby fully incorporated by reference herein.

BACKGROUND

Field

This invention relates generally to a radio frequency identification (RFID) system, and more particularly to a RFID reader, a RFID tag and a RFID protocol.

Related Art

An RFID system includes an RFID tag (hereinafter "tag") and an RFID reader (hereinafter "reader"). The tag comprises an antenna and an integrated circuit. The reader comprises an antenna and circuitry that includes a radio frequency (RF) transmitter and an RF receiver.

RFID technology includes a low frequency band, a high frequency band, an ultra-high frequency (UHF) band, and a microwave band. Each International Telecommunication Union region has its own specific frequency allocation within the UHF band; for example, Europe (Region 1) allocates 866-869 MHz, North and South America (Region 2) allocates 902-928 MHz, and Asia (Region 3) allocates 950-956 MHz. The frequency range 902-928 MHz is also referred to as an industrial, scientific and medical (ISM) radio band.

Several standardized methods of cryptography are known. Standardized methods of cryptography include defined ways of processing a data string. Objectives of cryptography include: 1) data confidentiality, i.e., protection against unauthorized disclosure of data; 2) data integrity, i.e., protection that enables the recipient of data to verify that it has not been modified in an unauthorized manner; 3) data origin authentication, i.e., protection that enables the recipient of data to verify the identity of the data originator; 4) non-repudiation, and 5) entity authentication. To achieve these objectives, cryptography may use algorithms for encrypting, hashing, digital signature, etc.

Authenticated encryption is an encryption method which simultaneously provides data confidentiality, data integrity and data origin authentication. An authenticated encryption method, known as encrypt-then-MAC, is defined in ISO/IEC 19772. The term "MAC" is an abbreviation for message authentication code. The encrypt-then-MAC encryption method, which applies a symmetric-key technique, can be incorporated into a conventional RFID transaction wherein a command of a reader instructs a tag to reply, in a ciphertext format, data from its memory with data confidentiality, data integrity and data origin authentication during its tag-to-reader transmission.

FIG. 1 depicts a known example of an authenticated encryption of data to be read from a memory of a tag by a reader. In FIG. 1, after the tag receives a conventional read request ("command") from the reader, the tag replies. The reply includes the read data from a memory of the tag. The read data is in ciphertext format after applying the authenticated encryption method to the data (for example, encrypt-then-MAC). Then, the reader cryptographically processes the tag's authenticated encrypted reply to confirm its integrity and data origin and to retrieve the plaintext data.

FIG. 2 depicts a known example of an authenticated encryption of data to be written to the memory of the tag by the reader. In the example shown in FIG. 2, the reader does not send a conventional write request to a tag in plaintext format; instead, the reader applies an authenticated encryption method to the data to be written (for example, encrypt-then-MAC). Then, the reader sends the ciphertext output to the tag. Next, the tag cryptographically processes the reader's authenticated encrypted message to confirm its integrity and data origin and to retrieve the plaintext data which is to be written into the memory of the tag.

In the examples shown in prior art FIGS. 1 and 2, protected data is provided with confidentiality, integrity and data origin authentication. Reader authentication using the symmetric-key technique is an operation using a cryptographic algorithm over a plurality of parameters. For example, AES-128 in CBC mode can be selected by the data_protection_mode to generate the protected_data.

Entity authentication is an encryption method which verifies that an entity actually is who or what they claim to be. There is a standardized and well-known entity authentication method that is based on a challenge-response mechanism and which is defined in ISO/IEC 9798-2. This challenge-response mechanism requires a claimant and a verifier to share a secret symmetric key (hereinafter "symmetric key"). Then, a claimant and a verifier carry out unilateral entity authentication using random numbers in two steps. The claimant confirms its identity by demonstrating knowledge of the symmetric key by encrypting a challenge (the random number) using the symmetric key. A conventional communication between a reader and a tag may include a symmetric-key technique.

In a RFID system, there are two possible kinds of unilateral entity authentication, one being reader authentication and other being tag authentication. In the current entity authentication methods of UHF RFID protocols, a typical tag authentication procedure begins with a reader sending a challenge to a tag. A challenge from a reader comprises a random number or time-varying data that cannot be anticipated or guessed by an attacker. The challenge from the reader is transmitted to the tag in plaintext. When the reader sends the challenge to the tag for tag authentication purpose, the tag is considered authentic if the tag proves to the reader that the tag has knowledge of the shared symmetric key. Obviously, the tag does so without publicly revealing the symmetric key. To prove to the reader that the tag has knowledge of the symmetric key, the tag encrypts the challenge with the symmetric key and sends the resulting ciphertext. The symmetric key cannot be extracted or inferred from a ciphertext and plaintext pair. Next, the reader decrypts the ciphertext and checks whether the received challenge matches the original challenge sent to the tag. If there is a match, the tag must have used the symmetric key and the tag is authentic.

FIG. 3 depicts a known example of tag authentication using the symmetric-key technique. In the known example shown in FIG. 3, the reader sends its challenge (e.g., a random number) to the tag, and, in response, the tag encrypts the challenge with the symmetric key and replies with ciphertext. This unilateral tag authentication in a UHF RFID protocol takes two steps.

FIG. 4 depicts a known example of reader authentication using the symmetric-key technique. In the known example shown in FIG. 4, as with known UHF RFID protocols, the reader talks first. The reader starts by sending out a challenge request, and, in response, the tag replies with a random number. Then, the reader encrypts the challenge with the symmetric key and transmits its output ciphertext. This unilateral reader authentication in accordance with known RFID protocols takes at least three steps. In the known example shown in FIG. 4, a fourth step is included which the tag confirms to the reader the outcome as being either a successful or an unsuccessful reader authentication.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 9 is a functional flow diagram performed at a reader regarding a protected read operation by a reader of data from a tag, in accordance with one embodiment of the invention.

FIG. 10 is a functional flow diagram performed at the tag regarding the protected read operation by the reader of data from the tag, in accordance with one embodiment of the invention.

DETAILED DESCRIPTION

Known UHF RFID protocols can provide unilateral entity authentication and authenticated encryption of data read or write operation by executing known UHF RFID protocols in sequence, disadvantageously resulting in many steps. The present invention provides unilateral entity authentication and authenticated encryption of data read or write operation in fewer steps, thereby advantageously requiring an exchange of fewer commands and responses between the reader and the tag.

Figure 5:
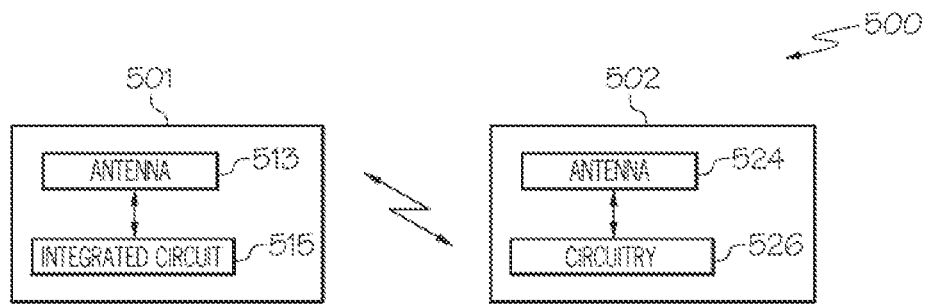
FIG. 5 depicts an RFID communication system including a tag and a reader.

FIG. 5 depicts an RFID communication system 500 which includes at least one RFID tag (hereinafter "tag") 501 and at least one RFID reader (hereinafter "reader") 502. The tag 501 comprises an antenna 513 and an integrated circuit 515. The reader 502 comprises an antenna 524 and circuitry 526. The arrow with two arrowheads indicates that the tag 501 and the reader 502 are in two-way wireless communication with each other.

Figure 6:
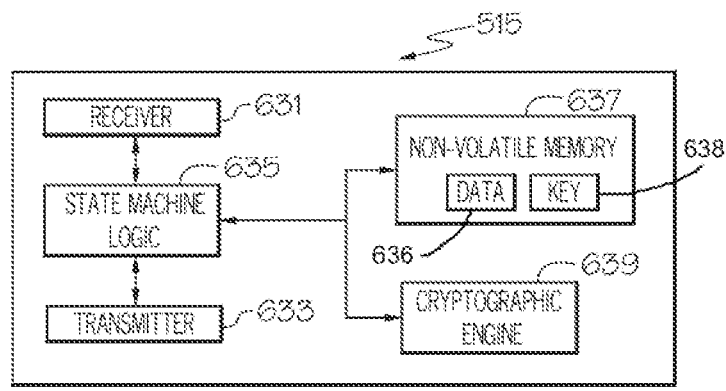
FIG. 6 is a simplified block diagram of the integrated circuit of a tag in accordance with one embodiment of the invention.

FIG. 6 is a simplified block diagram of the integrated circuit 515 of the tag 501 in accordance with the invention. The integrated circuit 515 includes analog circuitry and combinatorial and sequential digital logic circuitry that form a RF receiver 631; a RF transmitter 633; a finite state machine, or state machine logic, 635; a non-volatile memory (hereinafter "memory") 637 and a cryptographic engine 639. The memory 637 stores data 636 and/or a cryptographic key 638. The combinatorial and sequential digital logic circuitry controls the RF receiver 631, the RF transmitter 633, the memory 637 and the cryptographic engine 639. In particular, the state machine logic 635 and the cryptographic engine 639 are enhanced compared the state machine logic and the cryptographic engine of known tags. The tag 501 may also include an outer covering, or wrapper, of electrically insulating material.

Figure 7:
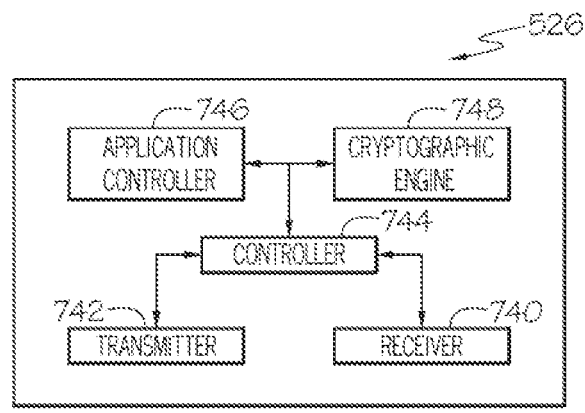
FIG. 7 is a simplified block diagram of the circuitry of a reader in accordance with one embodiment of the invention.

FIG. 7 is a simplified block diagram of the circuitry 526 of the reader 502 in accordance with the invention. The circuitry 526 includes a RF receiver 740, and a RF transmitter 742 coupled to a controller 744. The circuitry 526 also includes an application controller 746 and a cryptographic engine 748 that are coupled to the controller 744. The application controller 746 may include a microprocessor. The reader 502 is programmed with application software in the application controller 746 and firmware in the controller 744 to accomplish the methods in accordance with the invention.

Every RFID command begins with a command code that identifies a type of RFID command After the command code, a RFID command may have a message, handle and CRC. In one embodiment, each of the enhanced commands in accordance with the invention replaces a known command code and a known message of a known command with a command code in accordance with the invention and a message in accordance with the invention. In another embodiment, each of the enhanced commands in accordance with the invention replaces only a known message of a known command with a message in accordance with the invention.

Figure 8:
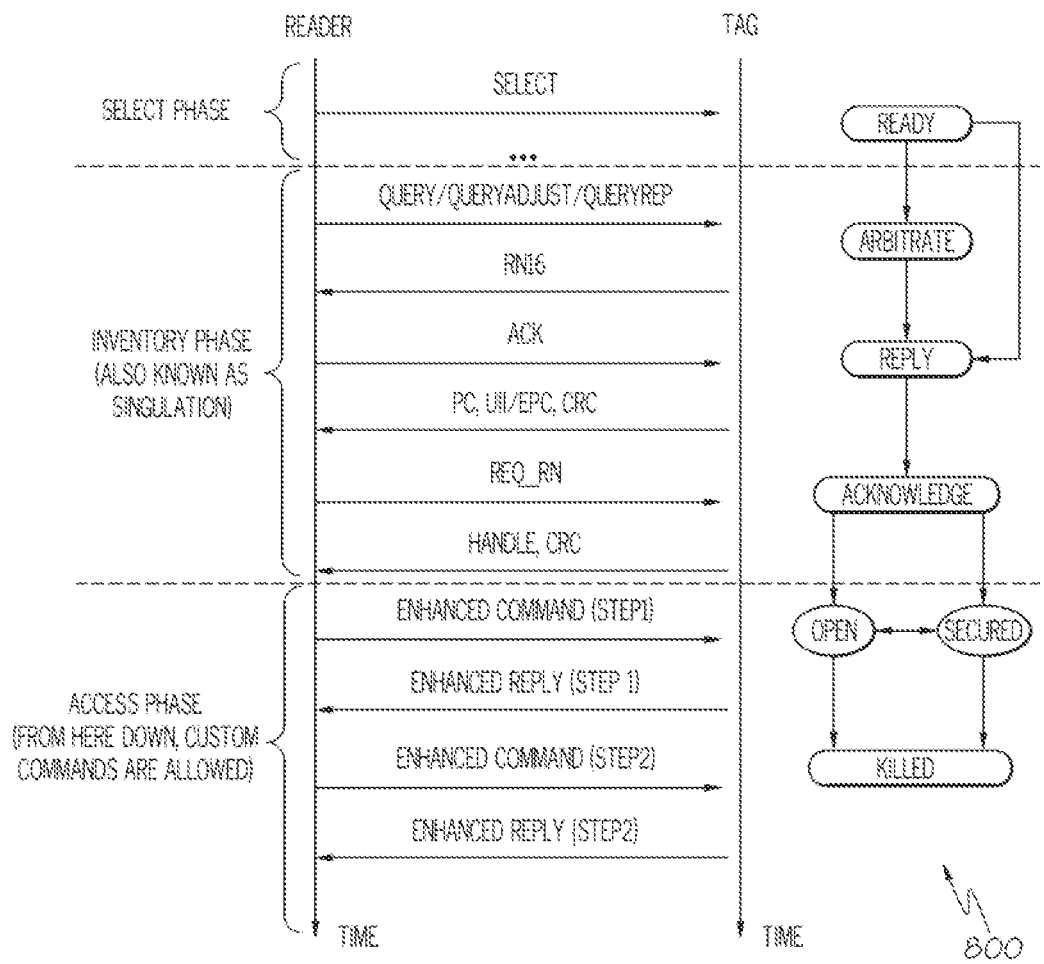
FIG. 8 depicts a simplified internal state diagram of the tag in accordance one embodiment of the invention.

FIG. 8 depicts a simplified internal state diagram 800 of a UHF RFID tag, as defined in RFID UHF protocols (for example GS1 EPCGlobal Gen2 protocol or ISO/IEC 18000-63). The tag 501 that implements the methods in accordance with the invention includes the operation of the internal state diagram 800. FIG. 8 describes a state flow of a RFID tag according to UHF protocols (GS1 EPCglobal Gen2 or ISO/IEC 18000-63). An RFID tag is controlled by an RFID reader which initiates the communication. The reader (including the reader 502) instructs the tag (including the tag 501) to enter several states. A plurality of states including a ready state, an arbitrate state, a reply state, an acknowledged state, an open state, a secured state and a killed state, are illustrated in FIG. 8. Generally speaking, the ready, arbitrate, reply and acknowledged states are preparatory steps for a reader to access a memory of a tag. A reader can only access one tag at a time, and the preparatory steps are necessary in order to singulate one tag from a collection of tags. The tags in the ready state receive a command from the reader and then the tags process the command by practicing an anti-collision arbitration algorithm defined by the UHF protocol specification. The reader's command may cause a tag to either enter the reply state or the arbitrate state. This is a complex singulation procedure performed by tags and readers so as to ultimately allow only one selected tag at a time to transition to other states after the reply state, while other tags wait in the arbitrate state. Once a tag is singulated by the reader, the tag shall be either in the open state or in the secured state. Then, the reader may read or write data from/to the memory of the singulated tag. Moreover, the reader may also send a custom, or enhanced, command Described herein are enhanced commands and corresponding enhanced replies applied after the singulation phase.

Arbitrate is a possible internal state of the tag 501. However, as shown in FIG. 8, the internal state of the tag 501 changes according to an exchange of enhanced commands and enhanced replies between the tag 501 and the reader 502. According to the UHF protocols, the reader 502 always executes the steps for singulation; therefore, during the singulation phase, the tag 501 may transition to the arbitrate state temporarily. Eventually, the tag 501 transitions to the open state or to the secured state. The enhanced commands take place when the tag 501 is in the open state or in the secured state. The steps shown in FIGS. 8 and 10 are executed by the tag 501 only when the internal state of the tag is either in the open state or in the secured state.

FIG. 9 is a functional flow diagram 900 of a method performed at the reader 502 during establishment of a unilateral tag authentication with an embedded protected read operation by the reader 502 of data 636 from the tag 501. At step 901, the reader 502 generates a challenge 1404 which is part of the enhanced read command 1301 shown in FIGS. 13 and 14. At step 903, the reader defines parameters to request a read of data 636 from the memory 637 of the tag 501. These parameters, such as a data include enable field, a pointer field and a word count field are included in the contents of the Data Request 1406 shown in FIG. 14. At step 905, the reader 502 defines a configuration parameter for the cryptographic engine 639 of the tag 501 over the challenge and defines the data 636 to be read from the memory 637. For example, the reader 502 instructs the tag 501 to execute AES cryptographic engine in CBC mode and in CMAC mode. The configuration parameter is found in the data protection mode 1408 field shown in FIG. 14. At step 907, the reader 502 assembles the enhanced command for transmission. At step 909, the reader 502 wirelessly transmits the enhanced read command 1301 to the tag 501. At step 911, the reader 502 receives the enhanced reply 1302 (see FIGS. 13 and 15) from the tag 501. The reader 502 performs the unilateral tag authentication with an embedded protected read operation of data from the tag 501 with fewer wireless transmissions between the tag 501 and the reader 502 compared to number of transmissions between a known tag and a known reader when the known reader performs separate unilateral tag authentication and protected read operations.

FIG. 10 is a functional flow diagram 1000 of a method performed at the tag 501 regarding the tag authentication with an embedded protected read operation by the reader 502 of data from the tag 501. When the tag 501 is singulated by the reader 502, the tag will be in an open or a secured state. Once a singulation has occurred and the tag 501 is in one of the open or the secured state, the reader 502 and the tag may follow the steps of the method. At step 1002, the tag 501 receives the enhanced read command 1301 (see FIG. 13) that was wirelessly transmitted by the reader 502 (see step 909 of FIG. 9). The enhanced read command 1301 includes a challenge 1404. At step 1004, the tag 501 examines the parameters of the enhanced command that were defined by the reader 502 at steps 903 and 905. At step 1006, based on parameters of the Data Request 1406, the tag 501 reads data from its memory 637. At step 1008, based on configuration parameters of the data protection mode 1408, the tag 501 runs its cryptographic engine 639 over the received challenge 1404 and over the data 636 from its memory 637. At step 1010, the tag 501 assembles the enhanced reply 1301 for transmission. At step 1012, the tag 501 wirelessly transmits the enhanced reply 1301 to the reader 502. The tag 501 performs the unilateral tag authentication with an embedded protected read operation by the reader 502 of data from the tag 501 with fewer wireless transmissions between the tag 501 and the reader 502 compared to number of transmissions between a known tag and a known reader when the known tag performs separate unilateral tag authentication and protected read operations.

Compared with known methods, fewer wireless transmissions are needed between the tag 501 and the reader 502 to accomplish the unilateral tag authentication with an embedded protected read operation by the reader 502 of data from the tag 501. To accomplish the unilateral tag authentication with an embedded protected read operation, the number of wireless transmissions between the tag 501 and the reader 502 is advantageously only two. The first wireless transmission is the enhanced command from the reader 502 to the tag 501, and the second wireless transmission is the enhanced reply from the tag 501 to the reader 502. On the other hand, the number of transmissions between a known tag and a known reader to accomplish the same task is disadvantageously four. The first wireless transmission is a known command from the known reader to the known tag (for tag authentication). The second wireless transmission is a known reply from the known tag to the known reader (for tag authentication). The third wireless transmission is a known command from the known reader to the known tag (for protected read). The fourth wireless transmission is a known reply from the known tag to the known reader (for protected read).

Figure 11:
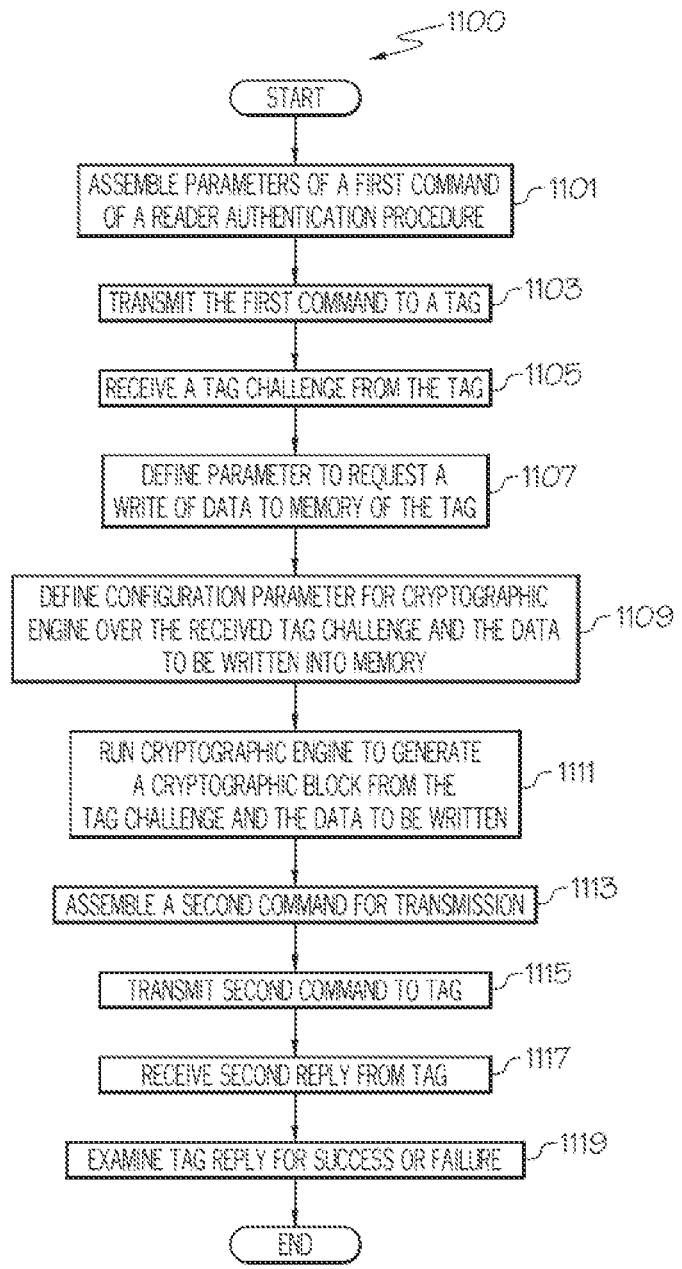
FIG. 11 is a functional flow diagram performed at a reader regarding a protected write operation by the reader of data to a tag, in accordance with one embodiment of the invention.

FIG. 11 is a functional flow diagram 1100 of a method performed at the reader 502 regarding a reader authentication with an embedded protected write operation by the reader 502 of data to the tag 501. At step 1101, the reader 502 assembles parameters for a first command 1601 for the tag 501. At step 1103, the reader wirelessly transmits the first command 1601 to the tag 501. At step 1105, the reader 502 wirelessly receives the enhanced reply 1602 from the tag 501 (see FIG. 16). The enhanced reply 1602 includes a challenge 1806 (see FIG. 18). At step 1107, the reader 502 defines parameters to request a write of data to the tag 501. At step 1109, the reader 502 defines a configuration parameter for the cryptographic engine 748 of the reader 502 over the challenge and defines the data that is to be written to the tag 501. At step 1111, the reader runs its cryptographic engine 748 to generate a cryptographic block comprising the encrypted tag challenge 1911 and the protected data 1909 (see FIG. 19) as a result of receiving the challenge 1806 from the tag 501 and to generate the protected data 1909 that is to be written to the tag. At step 1113, the reader 502 assembles an enhanced write command 1603 (see FIGS. 16 and 19). The enhanced write command 1603 includes a configuration parameter in a data protection mode 1910 field and a cryptographic block that contains the challenge 1911 and protected data 1909 that is to be written to the tag 501. At step 1115, the reader 502 wirelessly transmits the enhanced write command 1603 to the tag 501. At step 1117, the reader 502 receives an enhanced second reply 1604 (see FIGS. 16 and 20) from the tag 501. At step 1119, the reader 502 examines the enhanced second reply 1604 the content of which indicates success or failure of the transaction. The reader 502 performs the unilateral reader authentication with an embedded protected write operation of data to the tag 501 with fewer wireless transmissions between the tag 501 and the reader 502 compared to number of transmissions between a known tag and a known reader when the known reader performs separate unilateral reader authentication and protected write operations.

Figure 12:
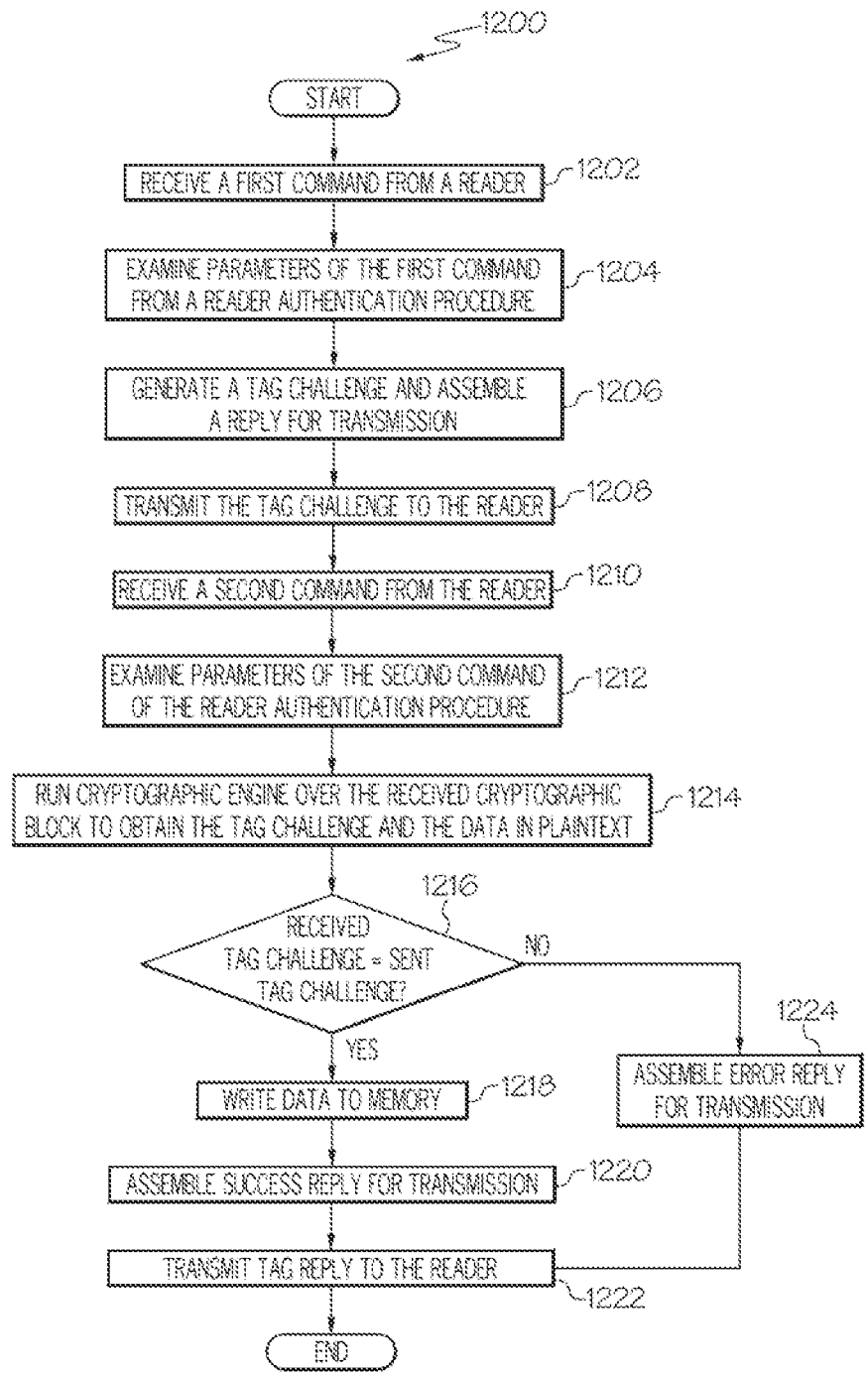
FIG. 12 is a functional flow diagram performed at the tag regarding the protected write operation by the reader of data to the tag, in accordance with one embodiment of the invention.

FIG. 12 is a functional flow diagram 1200 of a method performed at the tag 501 regarding the reader authentication with an embedded protected write operation by the reader 502 of data to the tag 501. When the tag 501 is singulated by the reader 502, the tag will be in an open or a secured state. Once singulation has occurred and the tag 501 is in one of the open or the secured state, the reader 502 and the tag may follow the steps of the method. At step 1202, the tag 501 receives the first command 1601 from the reader 502. The first command 1601 includes a request for a challenge 1705. At step 1204, the tag 501 examines the parameters of the first command 1601. At step 1206, in response to receiving the first command 1601, the tag 501 generates an enhanced reply 1602 which includes a challenge 1806, and the tag assembles the enhanced reply for transmission. At step 1208, the tag 501 transmits the enhanced reply 1602 to the reader 502. At step 1210, the tag 501 receives an enhanced write command 1603 from the reader 502. The enhanced write command 1603 includes the configuration parameter in the data protection mode 1910 field and the cryptographic block that contains the protected data 1909 that is to be written to the tag 501. At step 1212, the tag 501 examines the configuration parameter. At step 1214, the tag 501 runs its cryptographic engine 639 over the cryptographic block to obtain, in plain text, the challenge and the data. At step 1216, the tag 501 determines whether the challenge 1806 that was transmitted by the tag is the same as the challenge 1911 that was transmitted by the reader 502 and received by the tag. If true, then, at step 1218, the tag 501 writes the data into its memory 637, and then, at step 1220, the tag assembles a second enhanced reply 1604 that includes a success header, or code, for transmission. If false, then, at step 1224, the tag 501 assembles a second enhanced reply 1604 that includes an error header and error code for transmission. At step 1222, the tag 501 transmits the second enhanced reply 1604 which consists of one of a success reply and an error reply to the reader 502. The tag 501 performs the unilateral reader authentication with an embedded protected write operation by the reader 502 of data to the tag 501 with fewer wireless transmissions between the tag 501 and the reader 502 compared to number of transmissions between a known tag and a known reader when the known tag performs separate unilateral reader authentication and protected write operations.

Compared with known methods, fewer wireless transmissions are needed between the tag 501 and the reader 502 to accomplish the unilateral reader authentication with an embedded protected write operation by the reader 502 of data to the tag 501. To accomplish the unilateral reader authentication with an embedded protected write operation, the number of wireless transmissions between the tag 501 and the reader 502 is advantageously only four. The first wireless transmission is the first enhanced command from the reader 502 to the tag 501. The second wireless transmission is the first enhanced reply from the tag 501 to the reader 502. The third wireless transmission is the second enhanced command from the reader 502 to the tag 501. The fourth wireless transmission is the second enhanced reply from the tag 501 to the reader 502. On the other hand, the number of transmissions between a known tag and a known reader to accomplish the same task is disadvantageously six. The first wireless transmission is the first command from the known reader to the known tag (for reader authentication). The second wireless transmission is the first reply from the known tag to the known reader (for reader authentication). The third wireless transmission is the second command from the known reader to the known tag (for reader authentication). The fourth wireless transmission is the second reply from the known tag to the known reader (for reader authentication). The fifth wireless transmission is the third command from the known reader to the known tag (for protected write). The sixth wireless transmission is the third reply from the known tag to the known reader (for protected write).

Figure 1:
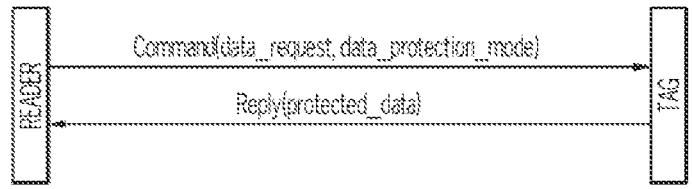
FIG. 1 depicts a known example of an authenticated encryption of data to be read from a memory of a tag by a reader.
Figure 2:
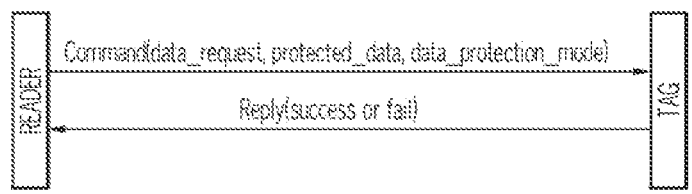
FIG. 2 depicts a known example of an authenticated encryption of data to be written to a memory of a tag by a reader.
Figure 3:
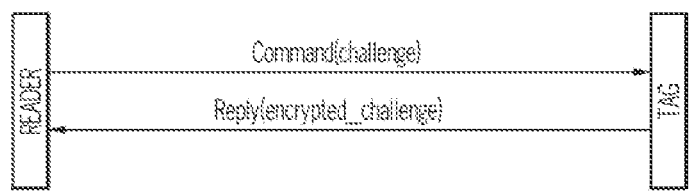
FIG. 3 depicts a known example of tag authentication using the challenge-response mechanism with a symmetric-key technique.
Figure 4:
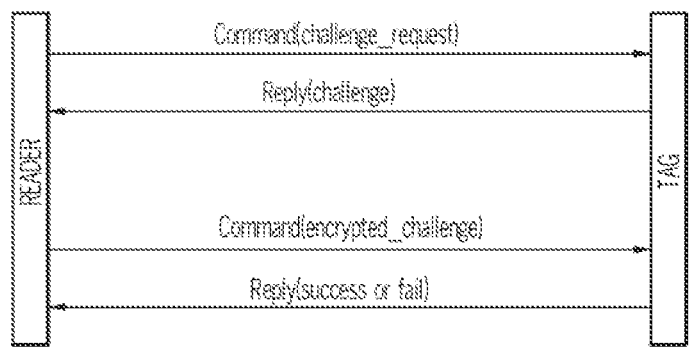
FIG. 4 depicts a known example of reader authentication using the challenge-response mechanism with a symmetric-key technique.

The methods in accordance with the invention combine two of the prior art examples described earlier. One prior art example is a method of authenticated encryption to add cryptographic security (hereinafter "security") to data, which is shown in FIG. 1 or FIG. 2. The other prior art example is a unilateral authentication based on challenge-response mechanism and symmetric-key techniques shown in FIG. 3 or in FIG. 4. The prior art example of the method of authenticated encryption to add security to data shown in FIG. 1 can be combined with the prior art unilateral authentication based on challenge-response mechanism and symmetric-key techniques shown in FIG. 3. The prior art example of the method of authenticated encryption to add security to data shown in FIG. 2 can be combined with the prior art example of unilateral authentication based on challenge-response mechanism and symmetric-key techniques shown in FIG. 4.

The request of information from or to the memory of the tag 501 is an independent and distinct parameter of a command from the reader 502, and the tag does not send back the request for information to the reader.

The challenge should have characteristics that minimize occurrences in which a reader re-sends the same stream of bits to a tag for authentication purposes to make it less likely that an attacker who does not have knowledge of the symmetric key could reuse a previous observed and successful authentication transaction. If an attacker did observe and record a previous successful authentication transaction, then, when a reader reuses the same value for a challenge, the attacker could transmit the recorded ciphertext and be authenticated, which is a security breach. Therefore, to avoid a quick and low-cost "replay attack" from occurring, a challenge is usually a random number or time-varying data with large enough range such that the challenge cannot be guessed or be exhaustively recorded by an attacker. Consequently, the challenge may consist of solely the random number or time-varying data. In another embodiment, the challenge may consist of the random number or time-varying data plus a request for information to read/write data to/from the memory of a tag.

Embedding a Protected Read Operation in a
Two-Step Tag Authentication with Cipher-Block
Cryptography The RFID communication system 500 may use an enhanced read command 1301 in accordance with the invention. The enhanced read command 1301 includes not only a challenge 1404 but also information, in plaintext, requesting a read operation from the memory 637 of the tag 501.

In the RFID communication system 500, tag authentication can be achieved by means of a two-step challenge-response mechanism using symmetric-key cryptography. See FIG. 13.

A first step of tag authentication comprises the reader 502 transmitting the enhanced read command 1301. Unlike the known read command shown in FIG. 1, the enhanced read command 1301 includes a tag authentication challenge (hereinafter "challenge") 1404, to the tag 501. See FIG. 14. The challenge 1404 comprises, in plaintext, a random number or time-varying data, generated by the reader 502. The enhanced read command 1301 includes all information (see Data Request 1406) needed for requesting the data that is to be read from the memory 637 of the tag 501. The enhanced read command 1301 includes information requesting a data protection mode 1408 for transmission of an enhanced reply 1302 from the tag 501. The data protection mode 1408 comprises a key pointer, a key size, a cryptographic algorithm selector and a cryptographic protection mode selector. In one embodiment, the data protection mode 1408 is the same symmetric-key and block-cipher mode used for the challenge-response component of tag authentication portion of the enhanced read command 1301. In other embodiments, the data protection mode 1408 may be implied and not be explicitly configured in the enhanced read command 1301. In still other embodiments, the data protection mode 1408 used for the data read from the memory 637 of the tag 501 may be a different data protection mode from the data protection mode used for the challenge-response component of tag authentication.

A second step of tag authentication comprises the tag 501 transmitting the enhanced reply 1302 to the challenge 1404. See FIG. 15. Unlike the known reply to the known read command shown in FIG. 1, the enhanced reply 1302 to the enhanced read command 1301 comprises a correct encryption by the tag 501 of the received challenge 1404 with a specific symmetric key 638 that has been shared between the tag and the reader 502 that are in communication with each other. A correct transmission by the tag 501 of the enhanced reply 1302 to the challenge 1404 from the reader 502 results in a successful authentication of the tag. With the method, the enhanced reply 1302 of the tag 501 comprises at least two components, one component being the encrypted response 1503 to the challenge 1404, and the other component being protected, or encrypted, encrypted data 1505 encrypted from data 636 read from the memory 637 of the tag in the data protection mode 1408 that was requested by the reader 502. Authenticated read information requested by the reader 502, implicitly or not, may be in plaintext, MAC protected, encrypted, or encrypted and MAC protected.

Figure 16:
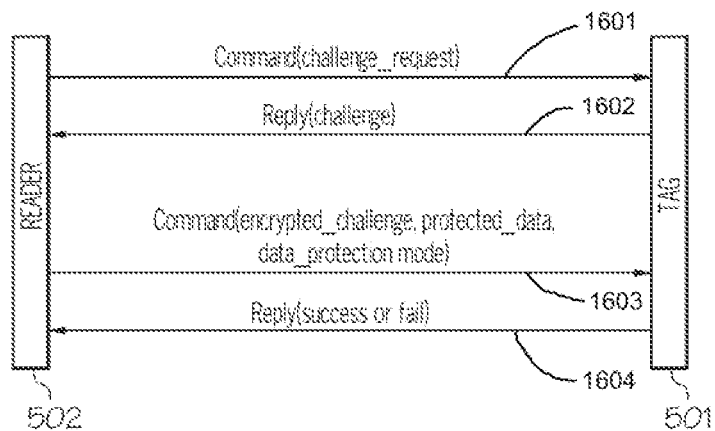
FIG. 16 depicts an example, in accordance with one embodiment of the invention, of reader authentication with authenticated encryption of data to be written to a memory of a tag by a reader, and further depicting a first command from the reader regarding a protected write by the reader of data to the tag, a first reply from the tag, a second command from the reader, and a second reply from the tag.

Embedding a Protected Write Operation in a
Four-Step Reader Authentication with Cipher-Block
Cryptography In the RFID communication system 500, reader authentication can be achieved by means of a four-step challenge-response mechanism using symmetric-key cryptography. FIG. 16 shows a series of transmissions between the reader 502 and the tag 501, initiated by the reader, in which the reader authenticates its identity to the tag and also writes data to the memory 637 of the tag via an encrypted wireless transmission.

A first step of reader authentication comprises an enhanced command 1601 from the reader 502 which includes a request by the reader to receive a challenge 1806 from the tag 501. See FIG. 17.

A second step reader authentication comprises the enhanced reply 1602 from the tag 501. The enhanced reply 1602 includes a challenge 1806 to the reader 502 in plaintext. See FIG. 18. The challenge 1806 from the tag 501 comprises in plaintext, a random number or time-varying data, generated by the tag.

A third step of reader authentication comprises the reader 502 transmitting an enhanced write command 1603 to the tag 501. Unlike the known write command shown in FIG. 2, the enhanced write command 1603 shown in detail in FIG. 19 includes not only the Data Request 1908, the protected or encrypted data 1909, and the data protection mode 1910 for writing data into the memory 637 of the tag 501, but also a correct encryption 1911 by the reader 502 of the challenge 1806 with a specific symmetric key 638 that has been shared between the reader and the tag that are in communication with each other. The enhanced write command 1603 includes all information (see Data Request 1908) needed for writing data to the memory 637 of the tag 501. The enhanced write command 1603 includes, in plaintext, information identifying the data protection mode 1910 that was used by the reader 502 to encrypt the data which is to be written in the memory 637 of the tag 501. In one embodiment, the data protection mode 1910 is based on the same symmetric-key and block-cipher mode used for the challenge-response component of the reader authentication. In another embodiment, the data protection mode 1910 may be implied and not be explicitly configured by the enhanced command from the reader 502. In still another embodiment, the data protection mode of the data written to the memory 637 of the tag 501 uses a different symmetric-key or block-cipher mode from the challenge-response component of the reader authentication.

A fourth step of reader authentication includes an enhanced second reply 1604 from the tag 501 that indicates either a success or a failure of the reader's authentication and/or protected write operation. See FIG. 20.

With the method in accordance with the invention, the sequence, position, quantity and length of the parameters that comprise the enhanced read command 1603 from the reader 502 or the enhanced second reply 1604 from a tag 501 are not fixed.

In one embodiment, the enhanced write command 1603 has a configuration parameter defining the data protection mode of the data operation. If not explicit, the configuration parameter is implied by the protocol. If explicit, the reader 502 is capable of choosing any one of the data protection modes in any given enhanced challenge-response authentication procedure.

In another embodiment, the enhanced write command 1603 has configuration parameters defining the key pointer, the key size, the cryptographic algorithm or the cryptographic protection mode to be used in the protection of the data operation. If not explicit, the configuration parameters are implied by the protocol and cannot be altered. If explicit, the reader 502 is capable of choosing a specific symmetric key, cryptographic algorithm and data protection mode in any given enhanced challenge-response authentication procedure.

In still another embodiment, the enhanced write command 1603 instructs a data protection mode on the tag data that involves confidentiality based on a cryptographic mode of operation. In another embodiment, the enhanced write command 1603 instructs the data protection mode on the data that involves generating a MAC for integrity purposes based on a cryptographic mode of operation. In yet another embodiment, the enhanced write command 1603 instructs the data protection mode on the data that involves both confidentiality and generation of a MAC for integrity purposes based on a single or multiple cryptographic modes of operation. In yet another embodiment, the enhanced write command 1603 instructs the data protection mode on the tag data that does not involve any special cryptographic operation, allowing the transmission of the data in plaintext format.

In a further embodiment, the enhanced write command 1603 has another configuration parameter defining whether its datagram includes a data operation at all. If the data operation is not required, the procedure collapses down to a generic tag/reader authentication procedure which means that a reply from the tag 501 or a command from a reader 502 does not include any protected data at all.

In one embodiment, an enhanced command from the reader 502 instructs protected data to be written to the memory of the tag 501 in which such protected data constitutes part of, or an entire, cryptographic key.

Figure 13:
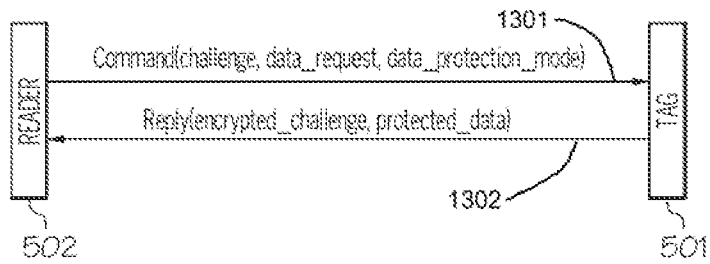
FIG. 13 depicts an example, in accordance with one embodiment of the invention, of tag authentication with authenticated encryption of data to be read from a memory of a tag by a reader, and further depicting a command from a reader regarding a protected read by the reader of data from the tag, and depicting a reply from a tag to the command
Figure 14:
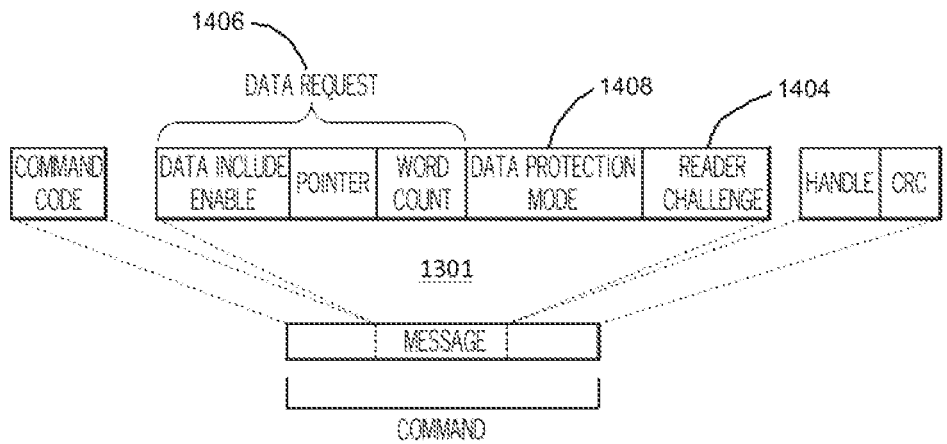
FIG. 14 illustrates an example of the contents of the command shown in FIG. 13.
Figure 15:
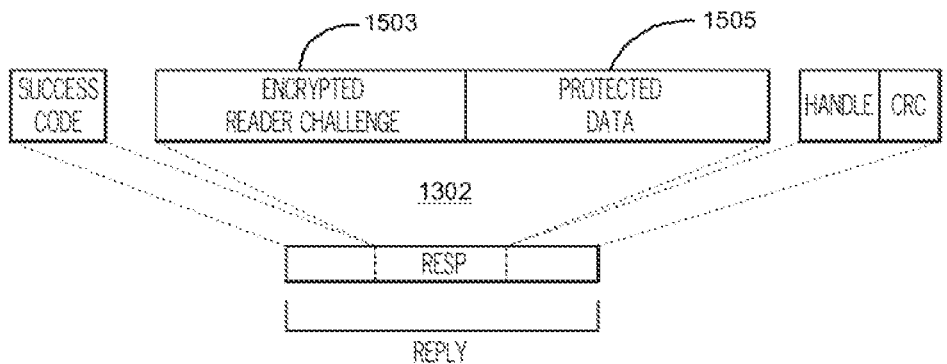
FIG. 15 illustrates an example of the contents of the reply shown in FIG. 13.

An example of an embodiment of the method in accordance with the invention is shown in FIGS. 13, 14 and 15.

FIG. 13 depicts an example, in accordance with one embodiment of the invention, of authenticated encryption of data to be read from the memory of the tag 501 by the reader 502, and further depicting the enhanced read command 1301 from the reader regarding protected read by the reader of data 636 from the tag, and depicting the enhanced reply 1302 from the tag to the enhanced read command FIG. 14 depicts the enhanced read command 1301 from the reader 502 and its message contents during a tag authentication with embedded protected read. A message portion of the enhanced read command 1301 comprises a Data Request 1406, a data protection mode 1408 and a reader challenge 1404. The Data Request 1406 comprises a data include enable field, a pointer field and a word count field. The reader challenge 1404 contains a random number or time-varying data. The message portion contains the information necessary to execute the command. The enhanced read command 1301 also includes a command code, a handle and a CRC. The command code specifies a command type. The handle is a number that allows the reader 502 to specify a particular tag 501 from among a plurality if tags, each of which may have a different handle, and the CRC is an error-check code that allows the tag to check the command for errors. Each of these fields is described in more detail in the GS1 EPCglobal Gen2 specification or in the ISO/IEC 18000-63 standard.

FIG. 15 depicts the enhanced reply 1302 from the tag 501 and contents ("RESP") of the enhanced reply during a tag authentication with embedded protected read. The RESP portion of the enhanced reply 1302 from the tag 501 includes data that confirms the authenticity of the tag 501. The tag 501 confirms its authenticity by including, in the RESP portion of the enhanced reply 1302, the reader's challenge in ciphertext (see encrypted reader challenge 1503). The encrypted reader challenge 1503 contains the content of the reader challenge 1404 after the content has been encrypted with the shared symmetric key 638. The RESP portion of the enhanced reply 1302 from the tag 501 also includes the protected, or encrypted, data 1505 encrypted from the data 636 in the memory 637 of the tag.

FIG. 16 depicts an example, in accordance with one embodiment of the invention, of an authenticated encryption of data to be written to the memory 637 of the tag 501 by the reader 502 including the enhanced command 1601 from the reader to the tag, an enhanced reply 1602 from the tag 501, the enhanced write command 1603 from the reader 502, and the enhanced second reply 1604 from the tag.

Figure 17:
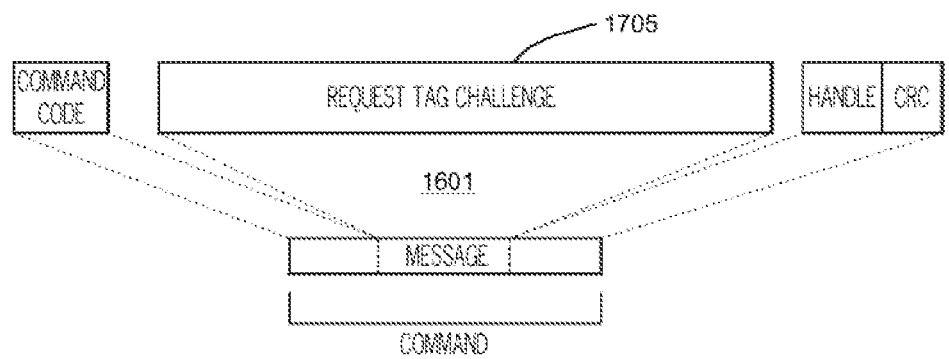
FIG. 17 illustrates an example of the contents of the first command shown in FIG. 16.

FIG. 17 illustrates an example of the contents of the enhanced write command 1601, which is a first command from the reader 502 (see step 1103) during a reader authentication procedure with embedded protected write. The enhanced command 1601 is used when the reader 502 requests a challenge from the tag 501. The enhanced command 1601 includes a message portion comprising a request tag challenge 1705 field containing control information that requests the tag 501 to generate and send its challenge 1806 to the reader 502. The control information may be considered unnecessary in an embodiment in which a dedicated code (not shown) for the enhanced command 1601 is used in this step. In such case, the message portion of the enhanced command 1601 could be empty.

Figure 18:
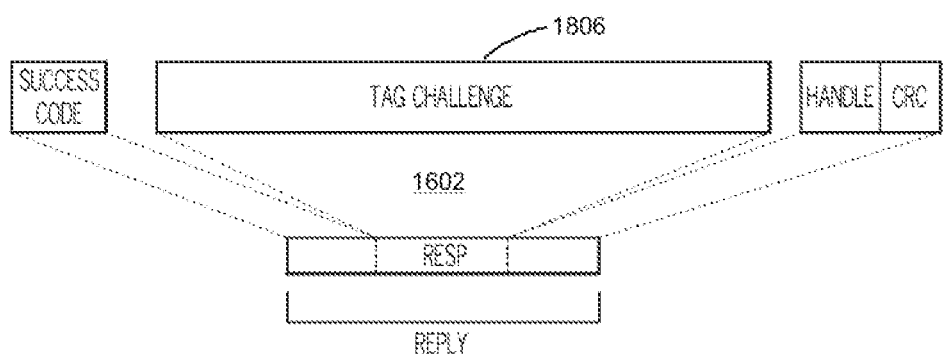
FIG. 18 illustrates an example of the contents of the first reply shown in FIG. 16.

FIG. 18 illustrates an example of the contents of the enhanced reply 1602. FIG. 18 illustrates the enhanced reply 1602 from the tag 501 (see step 1208) from the tag during a reader authentication with embedded protected write. The tag challenge 1806 field contains only a random number or time-varying data.

Figure 19:
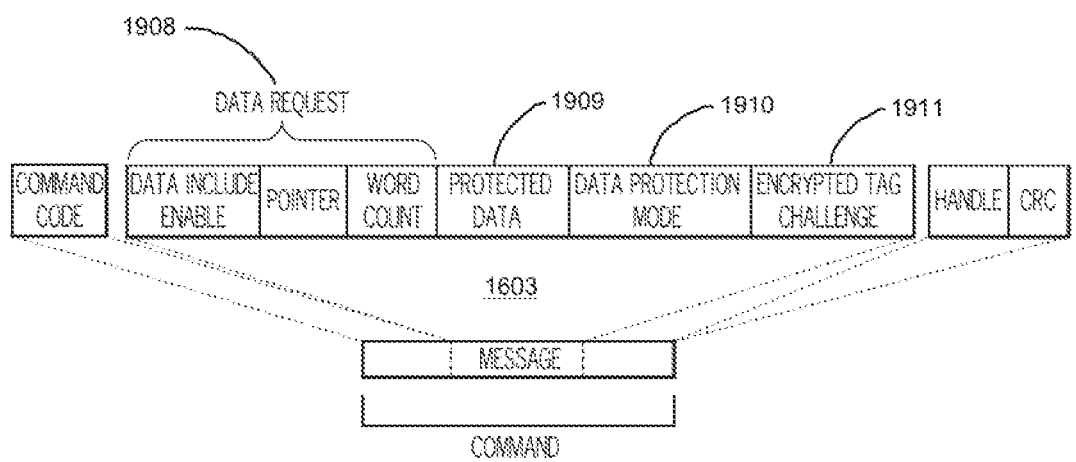
FIG. 19 illustrates an example of the contents of the second command shown in FIG. 16.

FIG. 19 illustrates an example of the contents of the enhanced write command 1603, which is a second command from the reader 502 (see step 1115) during a reader authentication procedure with embedded protected write. In one embodiment, the parameter Data Request 1908 could be avoided if such functionality is always implicit and imposed by the enhanced command, so in such embodiment of the disclosure, this parameter is avoided in the message field. Similarly, the parameter data protection mode 1910 could also be avoided if such functionality is always implicit and imposed in a specific embodiment. In another embodiment, the enhanced write command 1603 defines that the parameter pointer and the parameter word count is encrypted according to the data protection mode 1910, instead of being transmitted in plaintext format. Moreover, the order of any parameters inside the message portion of the enhanced write command 1603 could be changed. It is foreseeable that any parameters could be broken into subparts, i.e., split and rearranged.

As mentioned previously, the data protection mode 1910 may include control/configuration information for the protection of the data, including, but not limited to: definition of which cryptographic algorithm to be used, key pointer, key size, and the selection of the cryptographic protection mode used such as confidentiality only (CBC), integrity only (CMAC), confidentiality with integrity (CBC+CMAC) or simply plaintext (no cryptography).

Figure 20:
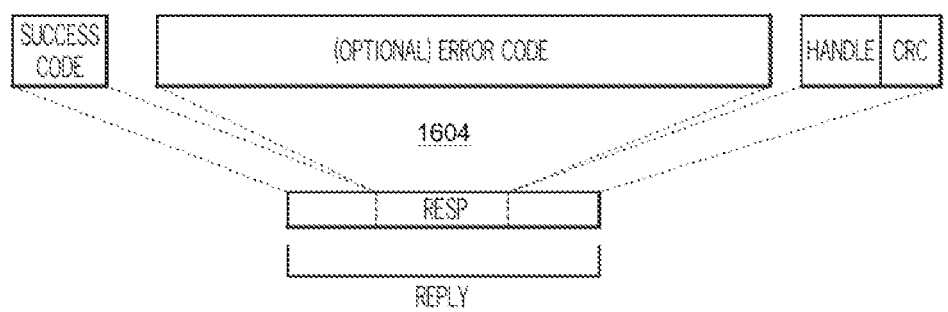
FIG. 20 illustrates an example of the contents of the second reply shown in FIG. 16.

FIG. 20 illustrates an example of the contents of the enhanced second reply 1604 from the tag 501 shown in FIG. 16 (see step 1222) from the tag during the reader authentication procedure with embedded protected write. If the write operation or authentication step fails, the tag 501 replies with an error header and the RESP may include an error code to identify the specific type of error. Otherwise, if succeeded, the tag 501 replies with a success header and the RESP may be empty as there is no need to send any further information to the reader 502.

Figure 21:
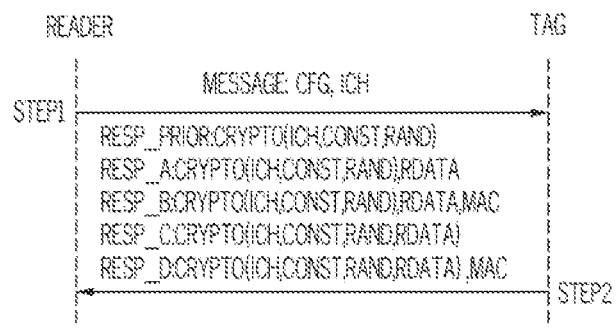
FIG. 21 illustrates transmissions between a tag and a reader regarding a protected read operation by the reader of data from the tag, in accordance with one embodiment of the invention.

Embodiments of the Method for Tag Authentication with Protected Read Operation FIG. 21 depicts four (4) embodiments of the method for tag authentication with protected read in accordance with the invention. FIG. 21 also depicts, for comparison purposes, the content of a known response from a known tag.

"RESP_PRIOR" is a known challenge-response tag authentication: no RDATA is read from a memory of the known tag.

"RESP_A" is tag authentication and reading RDATA from the memory 637 of the tag 501 in accordance with one embodiment of the method, wherein RDATA is plaintext data.

"RESP_B" is tag authentication and reading RDATA from the memory 637 of the tag 501 in accordance with another embodiment of the method, wherein RDATA is plaintext data followed by a MAC calculated using AES-128 CMAC mode.

"RESP_C" is tag authentication and reading RDATA from the memory 637 of the tag 501 in accordance with yet another embodiment of the method, wherein RDATA is cryptographed data in AES-128 CBC encryption mode.

"RESP_D" is tag authentication and reading RDATA from the memory 637 of the tag 501 in accordance with still another embodiment of the method, wherein RDATA is cryptographed data in AES-128 CBC encryption mode followed by a MAC calculated using AES-128 CMAC mode.

The order of parameters within message or RESP portions of the command may be changed. Inasmuch as CFG may be implied and fixed by a protocol version, CFG, CONST and RAND are optional parameters.

Figure 22:
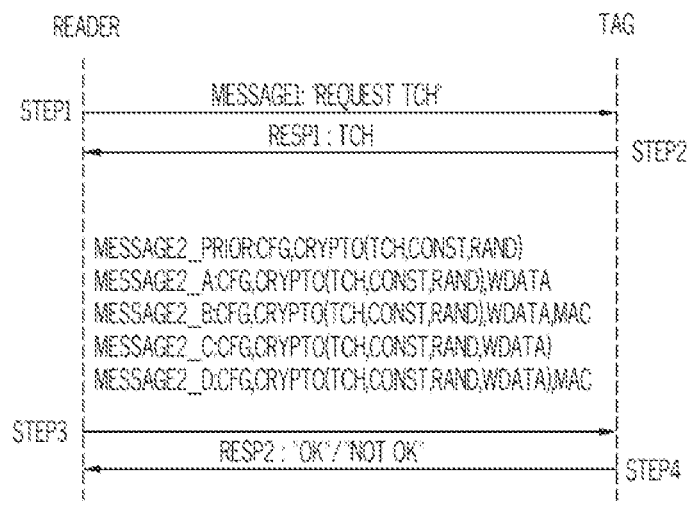
FIG. 22 illustrates transmissions between a reader and a tag regarding a protected write operation by the reader of data to the tag, in accordance with one embodiment of the invention.

Embodiments of the Method for Reader Authentication with Protected Write Operation FIG. 22 depicts four (4) embodiments of the method for reader authentication with protected write in accordance with the invention. FIG. 22 also depicts, for comparison purposes, the content of a known response from a known reader.

"MESSAGE2_PRIOR" is a known challenge-response interrogator authentication: no WDATA is written to a memory of a known tag.

"MESSAGE2_A" is a reader authentication with writing WDATA to the memory 637 of the tag 501 in accordance with one embodiment of the invention, wherein WDATA is plaintext data.

"MESSAGE2_B" is a reader authentication with writing WDATA to the memory 637 of the tag 501 in accordance with another embodiment of the invention, wherein WDATA is plaintext data followed by a MAC calculated using AES-128 CMAC mode.

"MESSAGE2_C" is a reader authentication with writing WDATA to the memory 637 of the tag 501 in accordance with yet another embodiment of the invention, wherein WDATA is cryptographed data in AES-128 CBC decryption mode.

"MESSAGE2_D" is a reader authentication with writing WDATA to the memory 637 of the tag 501 in accordance with still another embodiment of the invention, wherein WDATA is cryptographed data in AES-128 CBC decryption mode followed by a MAC calculated using AES-128 CMAC mode.

The order of parameters within message or RESP portions of the enhanced command may be changed. Because CFG may be implied and fixed by a protocol version, CFG, CONST and RAND are optional parameters.

The methods in accordance with the invention advantageously achieve authentication and a combination of: 1) data confidentiality, 2) data integrity, and 3) data origin authentication.

Definition of Terms and Abbreviations

Encryption: the conversion of data into a form called a ciphertext that cannot be easily understood by unauthorized people.

Cipher-block cryptography: cryptography based on block cipher, as opposed to cryptography based on stream ciphers.

Symmetric-key technique: a technique that uses the same cryptographic keys for both encryption of plaintext and decryption of ciphertext, as opposed to asymmetric-key techniques where the cryptographic key for encryption is different from the one for decryption.

Cryptographic key: a string of bits used by a cryptographic algorithm to transform plaintext into ciphertext or vice versa. This key remains private and ensures secure communication.

Message: a parameter or a plurality of parameters inside a command from a reader.

RESP: a parameter or a plurality of parameters inside a reply from a tag.

CFG: a collection of configuration parameters that:
  selects if additional data in response is present, e.g., the data request of FIG. 13;
  selects if the additional data is cryptographically protected with confidentiality, e.g., the data protection mode of FIG. 13;

selects if the additional data is cryptographically protected by a MAC, e.g., the data protection mode of FIG. 13;

selects if the additional data is cryptographically protected by a MAC and with confidentiality, e.g., the data protection mode of FIG. 13;

selects if the additional data is in plaintext format, e.g., data protection mode of FIG. 13;

selects the memory position and length of the additional data, e.g., the pointer and word count of FIG. 13;

selects a key for use in the cryptographic operation, e.g., the data protection mode of FIG. 13; and selects if the WDATA is a data value or a key update value, e.g., the pointer, the word count and the data protection mode of FIG. 19.

CBC: cipher block chaining, a block cipher mode defined in NIST SP800-38A.

CMAC: block cipher-based message authentication code (as described in NIST SP800-38B).

CONST: constant number (optional).

PC: protocol control word that mainly defines the number of words of UII/EPC (see GS1 EPCGlobal Gen2 protocol or ISO/IEC 18000-63).

RAND: random number (optional).

RDATA: additional data read from memory.

RN16: 16-bit random or pseudo-random number (see GS1 EPCGlobal Gen2 protocol or ISO/IEC 18000-63).

WDATA: additional data to write to memory or new key value.

AES: advanced encryption standard, a block cipher defined in FIPS PUB 197 and ISO/IEC 18033-3.

AES-128: AES block cipher using a 128-bit key.

ICH: interrogator challenge (also known as reader challenge).

TCH: tag challenge.

UII/EPC: code that identifies the object to which a tag is affixed (see GS1 EPCGlobal Gen2 protocol or ISO/IEC 18000-63).

What is claimed is:

1. A method for performing a protected read operation in a RFID system, comprising:
 a reader transmitting an enhanced read command to a tag, the enhanced read command including:
  a challenge, generated by the reader, in plaintext, wherein the tag has no advanced knowledge of a value of the challenge;
  a request for data from a memory of the tag, the request comprising a data include enable field, a pointer field and a word count field, wherein the data include enable field defines whether the reply to the enhanced read command includes a data operation, and
  a cryptographic data protection mode for transmission of an enhanced reply from the tag, wherein the cryptographic data protection mode is one of: encrypted, or encrypted and MAC protected; and
 in response to the enhanced read command, the tag transmitting, in a single wireless transmission, the enhanced reply to the challenge, the enhanced reply including:
  an encrypted response to the challenge, wherein the challenge was received by the tag in plaintext, the encrypted response encrypted using a shared symmetric key, the shared symmetric key being shared between the reader and the tag, and
  encrypted data derived from data in the memory of the tag, the data having been encrypted using the cryptographic data protection mode, wherein the cryptographic data protection mode is different from the shared symmetric key.

2. The method of claim 1, wherein the challenge includes one of a random number and time-varying data generated by the reader, wherein the tag has no advanced knowledge of numeric values of the random number and time-varying data, wherein the request is in plaintext and includes information defining the data being requested from the memory of the tag, and wherein the encrypted response to the challenge includes a constant number CONST and a random number RAND.

3. The method of claim 1, wherein an authentication of the tag and data from the tag are embedded in a same wireless transmission from the tag, and wherein the authentication of the tag includes a correct encryption of the challenge.

4. A RFID reader, comprising:
 a radio frequency receiver and a radio frequency transmitter; and
 a controller coupled to the radio frequency receiver and to the radio frequency transmitter,
 wherein the radio frequency transmitter transmits a request for a challenge to a RFID tag,
 wherein the radio frequency receiver receives a reply from the RFID tag, the reply including a challenge, generated by the tag, in plaintext, wherein the reader has no knowledge of a value of the challenge prior to receiving the challenge from the tag,
 wherein the radio frequency transmitter transmits, in a single transmission, an enhanced write command to the RFID tag, the enhanced write command including:
  a response to the challenge, the response being a correct encryption by the reader of the challenge received from the tag,
  encrypted data that is to be written to a memory of the RFID tag, and
  information, in plaintext, needed for writing the encrypted data to the memory of the RFID tag, the information including identifying a data protection mode that was used to encrypt the encrypted data, the data protection mode being one of: confidentiality only (CBC) or confidentiality with integrity (CBC+ CMAC),
  the information also including a data include enable field, a pointer field and a word count field, wherein the data include enable field defines whether the enhanced write command includes a data operation,
 wherein the radio frequency receiver receives an enhanced second reply from the RFID reader, the enhanced second reply including one of:
  a success header if writing the encrypted data to the memory of the RFID tag succeeded, and
  an error header and an error code to identify a specific type of error, if writing the encrypted data to the memory of the RFID tag failed.

5. The RFID reader of claim 4, including a cryptographic engine coupled to the controller, wherein the enhanced write command includes a data request, the data request including a data protection mode comprising a cryptographic algorithm selector, a key pointer, a key size, and a cryptographic protection mode, wherein the cryptographic algorithm selector selects a cryptographic algorithm from the cryptographic engine, and wherein the key pointer and key size can select one of a plurality of cryptographic keys.

6. A RFID tag, comprising:
 a radio frequency receiver and radio frequency transmitter;

circuitry, coupled to the radio frequency receiver and radio frequency transmitter;

a memory, coupled to the circuitry, for storing un-encrypted data and a cryptographic key; and a cryptographic engine, coupled to the circuitry, for performing cryptographic operations, wherein the RFID tag, after being singulated by a reader, receives an enhanced read command from the reader during an access phase of the reader, wherein the enhanced read command includes a tag authentication challenge in plaintext, generated by the reader, wherein the tag has no knowledge of a value of the tag authentication challenge in advance of receiving the enhanced read command, a data request comprising a data include enable field, a pointer field and a word count field, wherein the data include enable field defines whether a reply to the enhanced read command includes a data operation, and information requesting a data protection mode including a mode selector, wherein the mode selector selects one of: plaintext mode, MAC protected mode, encrypted mode, and encrypted and MAC protected mode, wherein the data protection mode includes parameters defining a key pointer, a key size, and a definition of a cryptographic algorithm, wherein, subsequent to receiving the enhanced read command, the RFID tag encrypts, using the cryptographic algorithm, an authentication of the tag authentication challenge, and, only when the encrypted mode or the encrypted and MAC protected mode is selected, the RFID tag encrypts, using the selected data protection mode, the un-encrypted data in the memory, the encryption of the un-encrypted data in the memory executed by the tag without requiring reception of any command during the access phase of the reader that requires use of cryptography other than the enhanced read command, and wherein the RFID tag transmits, in a single wireless transmission, a reply consisting of one of:

the authentication and the un-encrypted data when the plaintext mode or the MAC protected mode is selected, and the authentication and encrypted data derived from the un-encrypted data when the encrypted mode or the encrypted and MAC protected mode is selected.

7. The RFID tag of claim 6, wherein the enhanced read command is received from a RFID reader, and wherein the tag authentication challenge includes a time-varying data generated by the RFID reader to be encrypted by the tag, wherein the tag has no advanced knowledge of a numeric value of the time-varying data.

8. The RFID tag of claim 6, wherein the encrypted mode and the encrypted and MAC protected mode use a symmetric-key and block-cipher different from the cryptographic key stored in the memory.

9. The RFID tag of claim 6, wherein the encryption is executed by the tag without requiring reception of any command from the reader via radio frequency during the access phase of the reader that requires use of cryptography other than the enhanced read command.

10. The RFID tag of claim 6, wherein the reader instructs the tag to enter one or more of a plurality of states including a ready state, an arbitrate state, a reply state, an acknowledged state, an open state, a secured state and a killed state, and wherein the RFID tag receives the enhanced read command while in the open state or in the secured state after being singulated by the reader.

11. The RFID tag of claim 10, wherein, during an access phase, the reader transmits the enhanced read command, and wherein the tag does not require any cryptographic command from the reader during a prior select phase or inventory phase to execute successfully the enhanced read command.

* * * * *